United States Patent Office 2,898,149
Patented Aug. 4, 1959

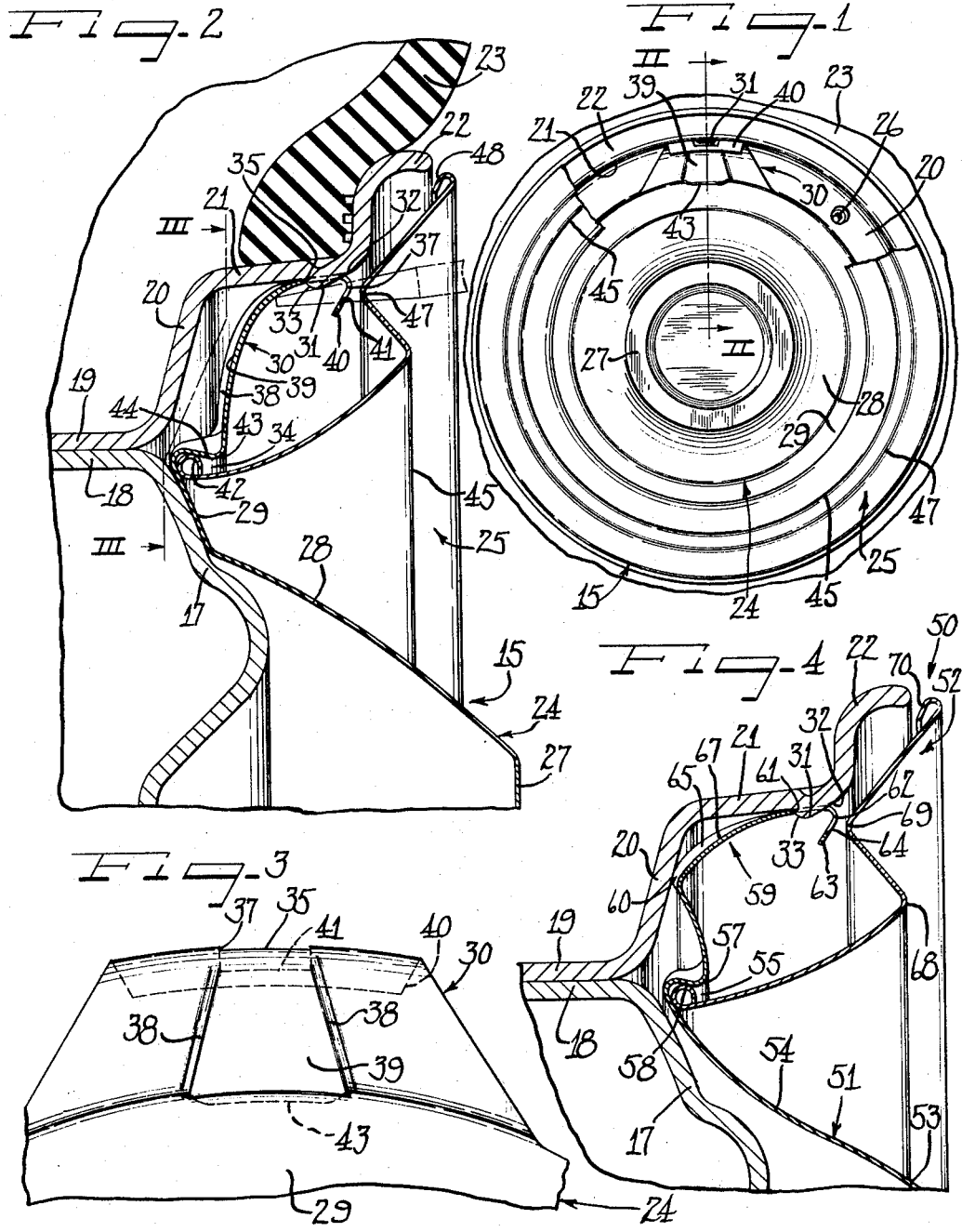

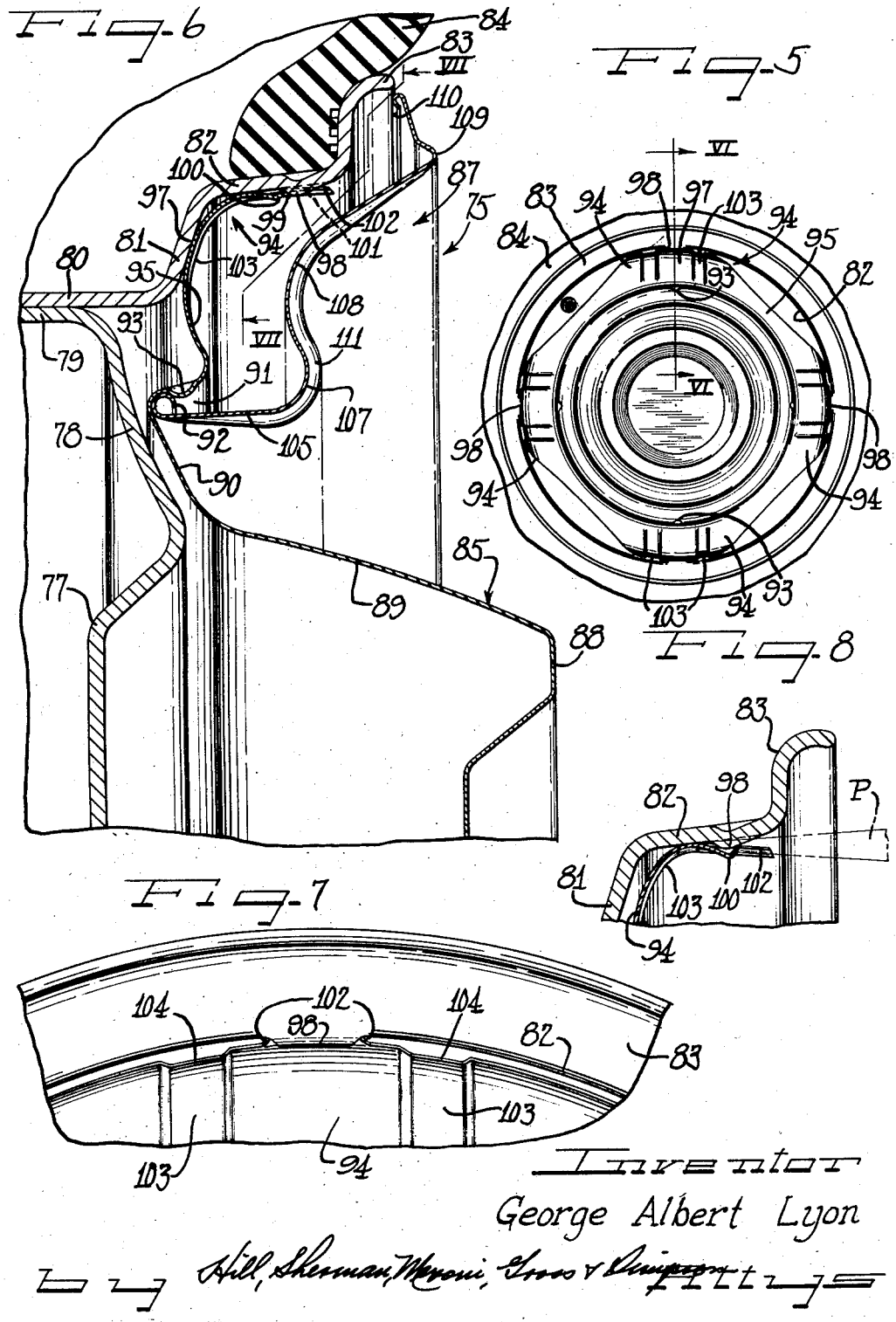

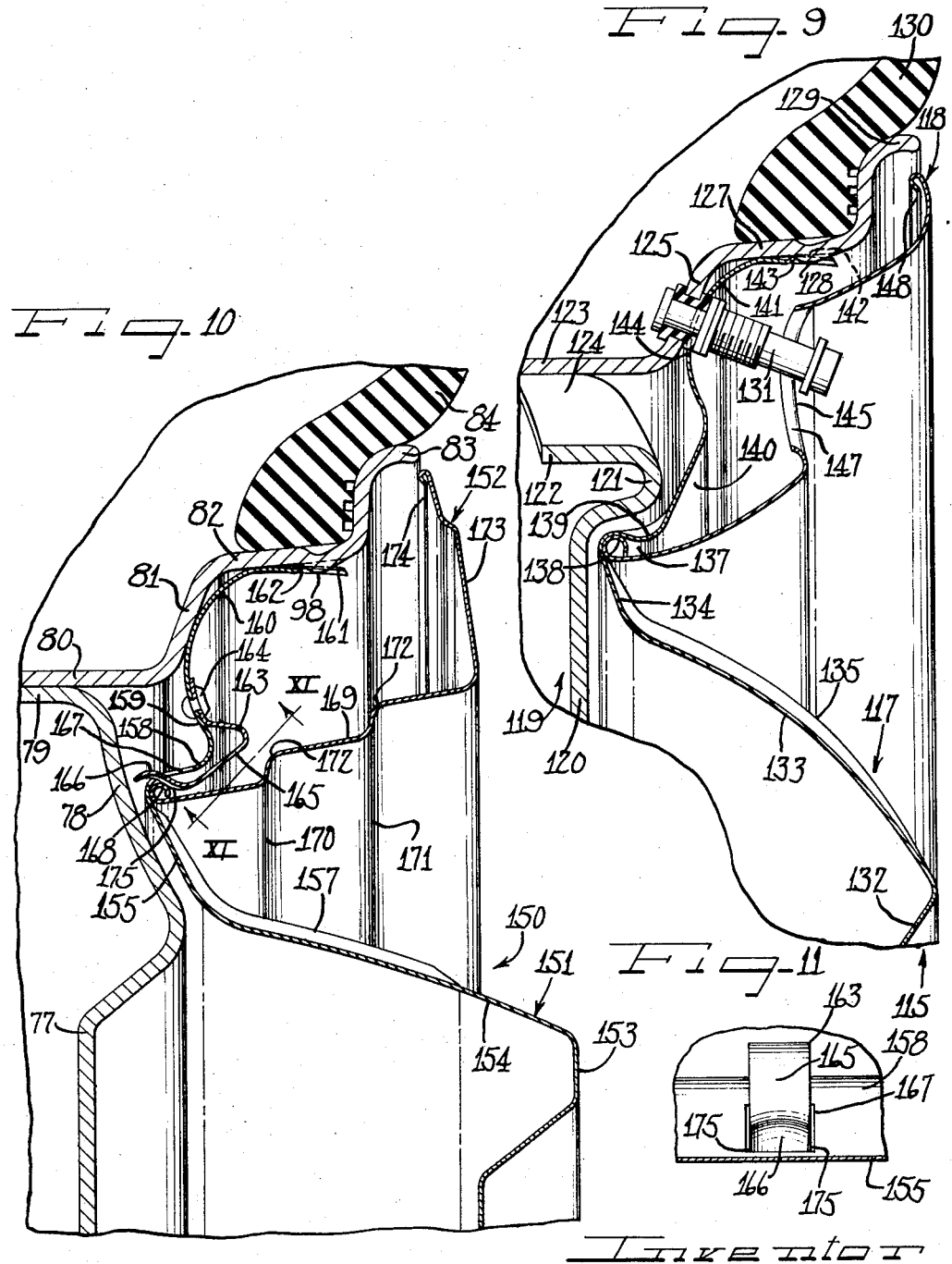

2,898,149

WHEEL COVER

George Albert Lyon, Detroit, Mich.

Application February 10, 1955, Serial No. 487,365

14 Claims. (Cl. 301—37)

The present invention relates to improvements in wheel structures and more particularly concerns the ornamental and protective covering of the outer sides of vehicle wheels.

An important object of the present invention is to provide a wheel structure including a novel cover for the outer side thereof enabling the provision of unusually deep draw section or contour.

There are limitations upon the depth to which sheet metal may be drawn without overstretching and rupturing of the material. Therefore, where there is a demand for an unusually deep draw in order to produce a high crown in the cover without undue projection of the crown beyond the outer side of the wheel, and thus requiring an intermediate portion of the cover to extend axially inwardly close to or into abutment with the wheel, resort may have to be had to making the cover in two separable parts instead of making it as a one-piece unit.

It is therefore another object of the invention to provide a novel two-part cover construction.

A further object of the invention is to provide novel means for retaining a cover on a wheel.

It is still another object of the invention is provide an improved cover construction for vehicle wheels in which the cover may have a fairly massive appearance but nevertheless of as light weight as practicable in view of the size of the cover.

Other objects, features and advantages of the present invention will be readily apparent from the following detailed description of certain preferred embodiments taken in conjunction with the accompanying drawings, in which:

Figure 1 is a side elevational view of a vehicle wheel structure embodying features of the invention, and with a part broken away for clarity of illustration.

Figure 2 is an enlarged fragmentary radial sectional view taken substantially on the line II—II of Fig. 1.

Figure 3 is a fragmentary rear elevational view taken substantially on the line III—III of Fig. 2 and showing the rear or inner side of one of the retaining fingers of the cover.

Figure 4 is a fragmentary radial sectional view similar to Fig. 2 but showing a modification of the cover.

Figure 5 is an outer side elevational view of a wheel structure showing another modification but with a portion of the cover assembly removed.

Figure 6 is a fragmentary radial sectional view on an enlarged scale taken substantially on the line VI—VI of Fig. 5.

Figure 7 is a fragmentary outer side elevational view taken substantially along the line VII—VII of Fig. 6.

Figure 8 is a fragmentary radial sectional view taken in substantially the same plane as in Fig. 6 of a portion of the tire rim and the retaining finger and showing the retaining finger in process of removal from the wheel.

Figure 9 is a fragmentary radial sectional view through still another modification.

Figure 10 is a fragmentary radiall sectional view disclosing another modification, and Figure 11 is a fragmentary sectional elevational detail view taken substantially on the line XI—XI of Fig. 10.

Having reference to Figs. 1–3, a wheel cover assembly 15 embodying features of the invention is arranged for disposition at the outer side of a vehicle wheel including a disk spider wheel body 17 provided with an axially inwardly extending outer marginal flange 18 secured in any suitable fashion to a base flange 19 of a drop center multiflange tire rim. From the outer side of the base flange 19 of the tire rim extends generally radially outwardly a side flange 20 merging with a generally axially outwardly extending and radially outwardly sloping intermediate flange 21 from the outer side of which extends a generally radially outwardly and then axially outwardly turned terminal flange 22. While the tire rim may support a pneumatic tire and tube assembly, in the present instance, in keeping with the modern trend, the tire rim is shown as supporting a tubeless tire 23, while a valve stem 26 is carried by the side flange 20 for inflating the tire.

According to the present invention the wheel cover 15 is constructed in two separable parts, comprising an inner or central high crown cover member 24 and an outer annular trim cover member 25 carried by the inner cover member. The construction of the cover members 24 and 25, and the relationship thereof to the wheel is such that the central cover member 24 is engageable retainingly with the wheel in snap-on, pry-off relation, while the outer annular cover member 25 is engageable in snap-on, pry-off relation with the inner or central cover member 24 and serves to conceal the cover retaining means of the central cover member.

By preference, the inner or central cover member 24 is of generally circular form and of a diameter to overlie and conceal the wheel body 17. To this end, the cover member 24 includes a high crown 27 of substantial width with a generally axially inwardly and radially outwardly sloping annular side wall 28 extending at its inner end to the wheel body 17 adjacent to juncture of the wheel body with the tire rim. At its inner end, the crown side wall 28 is provided with an anular generally radially outwardly extending bottoming flange 29 generally complementary to and in assembly bearing against the wheel body 17 at its radially outer margin adjacent juncture with the attachment flange 18.

Means for securing the central cover member 24 to the wheel include a series of generally radially outwardly extending retaining finger flanges 30 retainingly engageable with respective generally radially inwardly projecting retaining bumps 31 provided on the axially outer marginal portion of the intermediate flange 21 of the tire rim adjacent juncture thereof with the terminal flange 22. The bumps 31 may be provided by pressing the same inwardly in the intermediate flange 21 to provide a generally radially and axially inwardly sloping lead-in surface 32 and a generally undercut, axially and radially inwardly facing retaining shoulder 33 at the inner ends of the bumps.

By preference, the retaining fingers 30 are formed integrally in one piece as extensions from the margin of the central cover member 24, and in fact may comprise material which in a generally rectangular sheet metal blank from which the cover is formed comprises the four corners of the blank. Thereby the cover member 24 can be drawn without any substantial waste of material. Herein, the retaining fingers 30 project as extensions from an annular generally axially outwardly extending marginal extremity of the annular bottoming flange 29 and providing a generally radially inwardly facing shoulder or rim defining with the inner portion of the side wall 28 of the cover member generally axially outwardly opening annular groove. It will be appreciated that the rim flange 34 affords substantial reinforcement for the margin of the cover member 24. From the marginal flange 34, the retaining finger extensions 30 extend generally radially outwardly for overlying the side flange 20 of the tire rim, and the terminal portions of the fingers are turned generally axially outwardly for retaining engagement with the retaining bumps 31. Thus, as will be best seen in Fig. 2, the terminal portions of the fingers 30 are arranged to engage in shouldering generally radially resiliently yieldable face-to-face relation with the outer marginal portion of the intermediate flange 21.

For retaining engagement of the fingers 30 with the retaining bumps 31, the fingers are shaped normally to project at their terminal portions to a larger diameter than the inside diameter of the intermediate flange 21 adjacent and between the retaining bumps 31. In addition, each of the fingers 30 is provided with means for retaining, interlocking interengagement with the respective retaining bumps. Herein such retaining means comprise a generally axially outwardly facing or directed edge 34 on the terminal portion of the respective fingers defining the axially inner side or edge of a notch or cutout 35 in the terminal portion of the finger preferably formed at the longitudinal center of the finger and spaced substantially from each opposite side of the finger. This construction and relationship is such that in applying the inner or central cover member 24 to the outer side of the wheel, the retaining fingers 30 are placed in engagement with the tire rim at the axially outer side of the retaining bumps 31, and more particularly to lie against the lead-in cam surface 32 of the bumps. Pressure is then applied axially inwardly which causes the faces of the retaining fingers engaging the lead-in surfaces 32 to cam inwardly therealong as the fingers are placed under resilient radially inward deflection at their terminal portions, until the retaining edges 35 of the fingers snap behind the retaining shoulders 33 of the retaining bumps. As the retaining edges 35 cam radially outwardly and axially inwardly along the retaining shoulders 33, the resilient tension of the retaining fingers 30 is reflected in generally axially inward thrust toward the juncture of the fingers with the flanges 34 and 29 of the cover member and thus thrusting of the cover member bottoming flange 29 against the wheel body.

In order to enhance the resiliency of the retaining fingers 30, and also to assist in registering the retaining bumps 31 with the notches 37 in assembling the cover with the wheel, generally radially, but outwardly converging reinforcing rib bends 38 are formed in the retaining fingers, providing therebetween a central outwardly offset, channel-like guide groove or guideway 39 leading at the back of the finger to the retaining edge 35. It will be noted that the reinforcing rib structure tapers on a fade-in merger with the general back surface of the finger adjacent to the retaining edge 35 so that there will be no interference by such ribs with retaining engagement of the retaining edge 35 with the bump shoulder 33. As best seen in Fig. 2 the retaining edge 35 is thus adapted to engage the retaining bump adjacent juncture thereof with the intermediate flange 21. It will be appreciated that by virtue of the lead-in groove 39 it is possible to effect proper centering of the retaining fingers with the retaining bumps 31 during application of the cover to the wheel by feel since the ribs 38 at the opposite sides of the respective lead-in grooves provide contact means at the opposite sides of the respective bumps. Then, as the cover is pressed home, any eccentricity is adjusted by slight rotary adjustment as the ribs 38 lead the fingers into proper alignment of the retaining edges 35 with the retaining bumps.

In order to reinforce the retaining fingers 30, and to facilitate pry-off, the terminal extremity of each of the fingers is provided with a generally return bent generally radially and axially inwardly directed terminal flange 40 through which the retaining bump notch 37 extends and provides a substantial gap outwardly beyond the retaining bump 31 into which the end of a pry-off tool such as a screw driver as shown in dash outline in Fig. 2 can be inserted. Through this arrangement, pry-off leverage by the pry-off tool fulcruming against the retaining bump 31 and levering against an edge 41 at the outer end of the notch 37 and on the flange 40 will effect radially inward deflection of the terminal portion of the retaining finger to clear the retaining edge 35 thereof from the bump shoulder 33 and enable drawing of the retaining finger axially outwardly away from the retaining bump by means of the pry-off tool.

In addition to the resilient stiffness afforded by the terminal reinforcing flange 40, and the generally longitudinally extending reinforcing ribs 38, it will be observed that the retaining fingers 30 are of substantial tapering structure with their maximum width at the base or juncture portions thereof with the cover flange 34.

After the inner or central cover member 24 has been mounted on the wheel, the outer annular cover member 25 is secured in place on the inner cover member in overlying relation to the tire rim and the retaining fingers 30. To this end, the annular cover member 25 is of a diameter to extend from spaced overlying relation to the terminal flange 22 of the tire rim to an inner diameter engageable within the inset groove defined at its radially outer side by the cover flange 34.

For retaining the annular cover member 25 in snap-on, pry-off relation on the cover member 24, the inner margin of the cover member 25 is provided with an underturned generally radially outwardly projecting annular bead 42 retainingly engageable with generally radially inwardly projecting retaining bumps 43 pressed into the cover flange 34 preferably at juncture of the flange with the respective retaining fingers 30. Each of the retaining bumps 43 has a generally axially inwardly and radially outwardly sloping inner generally radially and axially inwardly facing retaining surface portion 44 behind which the retaining bead 42 snaps and is cammed into bottoming relation to the adjacent portion of the cover flange 29. This relationship affords the additional advantage that radially outward pressure exerted by the resilient retaining bead 42 against the retaining bumps 44 tends to exert a generally radially outward tension longitudinally along the retaining fingers 30 and thus improves the retaining tensioned engagement thrust of the finger edges 35 against the retaining bump shoulders 33.

From the retaining bead 42, the cover member 25 extends generally axially outwardly and radially to an annular generally axially outwardly extending intermediate rib 45 the radially outer side of which slopes generally axially inwardly and radially outwardly to a generally axially inwardly directed annular reinforcing rib 47 which in assembly lies generally opposite juncture of the terminal and intermediate flanges of the tire rim. From the rib 47 the outer marginal portion of the cover 25 extends generally radially and axially outwardly in overlying relation to the terminal flange 22 and is provided with a radially outer marginal underturned reinforcing and finishing bead 48.

Application of the cover member 25 to the assembly is effected by pressing the same axially inwardly into retaining engagement with the retaining bumps 43. Removal of the trim cover member 25 is effected by inserting a pry-off tool behind the outer margin portion thereof into pry-off engagement with the outer marginal bead 48 and then into pry-off engagement with the reinforcing and pry-off rib 47. Leverage exerted by the pry-off tool will cause the retaining bead 42 at the inner margin of the trim ring cover member 25 to snap out of retaining engagement with the retaining bumps 43. Thereafter, the cover member 24 can be removed from the wheel as described hereinabove.

In the present instance, the valve stem 24 is located between adjacent ones of the retaining fingers 30 and is enclosed by the cover member 25, the radially inner portion of which affords a substantial chamber over the valve stem and the retaining fingers 30. Access to the valve stem can be had readily by removal of the trim cover member 25.

In the modification of Fig. 4, a composite cover 50 is shown which in most respects is much the same as the cover 15, and is disposable at the outer side of a vehicle wheel which in all essential respects is the same as the wheel shown in Figs. 1 and 2. Therefore the same reference numerals identify the same parts of the wheel in Fig. 4. However, the cover 50 is constructed and arranged to be supported entirely by the tire rim and is thus especially suitable for situations where substantial variations in the axial relative relationship of the wheel body and the tire rim may occur and which might interfere with proper functioning relationship of the retaining fingers of the cover and the retaining bumps 31 of the wheel.

As shown, the cover 50 includes an inner or central cover member 51 and an outer annular trim cover member 52. The inner cover member includes a high crown portion 53 having a side wall 54 that slopes toward the juncture between the tire rim and the wheel body and merges at its inner extremity with a generally axially outwardly extending narrow annular reinforcing flange 55 defining an axially outwardly opening groove therewith and provided with retaining bumps 57 engageable in snap-on, pry-off relation by a retaining inner marginal bead 58 of the outer cover member 52 which engages into the outwardly opening groove.

Extending generally radially outwardly from the flange 55 is a series such as four retaining fingers 59 which in most respects are the same as the retaining fingers 30, but are provided with axially inwardly directed intermediate engagement shoulder 60 for bottoming against the side flange 20 of the tire rim. Thereby the cover member 51 is supported out of contact with the wheel body 17.

From the engagement shoulder 60, the retaining finger 59 extends generally axially outwardly and radially outwardly to engage the intermediate flange 21 of the tire rim at the retaining bump 31. A retaining edge 61 provided at the inner end of a slot 62 in the terminal portion of the finger 59 is engageable with the shoulder 33 of the retaining bump similarly as the retaining edge 35 in the form of Fig. 2. A turned terminal flange 63 on the finger 59 provides a pry-off edge 64 at the outer end of the notch or slot 62. Longitudinal reinforcing ribs 65 similar to the reinforcing ribs 38 are located at opposite sides of a lead-in groove 67.

The cover member 52 is in most respects similar to the cover member 25, and includes an intermediate reinforcing axially outwardly directed annular rib 68 at the radially outer side of which is an inwardly directed annular reinforcing and pry-off rib 69, and the radially outer margin of the cover slopes radially and axially outwardly into spaced overlying relation to the terminal flange 22 of the tire rim and has an underturned outer marginal reinforcing and finishing bead 70.

Application and removal of the cover members 51 and 52 is effected in substantially the same manner as with the cover members 24 and 25.

In the modification of Figs. 5–8, a cover assembly 75 according to the present invention is applied to the outer side of a vehicle wheel having a wheel body 77 having an outer marginal annular dished portion 78 provided with an axially extending attachment flange 79 secured in suitable manner to a base flange 80 of a tire rim. From the tire rim base flange 80 extends a side flange 81 merging with an intermediate flange 82 that extends generally axially outwardly and radially outwardly and joins a radially outwardly and then axially outwardly turned terminal flange 83. Supported by the tire rim is a pneumatic tire 84 which may be of a tubeless type.

The cover 75 comprises an inner or central cover member 85 and an outer annular cover member 87. The lationship of the cover members 85 and 87 to one another and the relationship of the cover assembly 75 to the wheel is substantially like that of the cover 50 in Fig. 4.

The inner cover member 85 is provided with a high central crown portion 88 provided with a generally axially inwardly and radially outwardly sloping side wall 89 leading to a generally radially outwardly and axially inwardly sloping annular intermediate flange portion 90 arranged in assembly with the wheel to lie in spaced adjacency to the dished annular portion 78 of the wheel body. At its radially outer extremity the flange 90 joins a generally axially outwardly extending annular shoulder flange 91 which in assembly with the wheel is arranged to be disposed in substantial radially inwardly spaced relation to the juncture of the base and side flanges of the tire rim and with the inner portion of the side wall 89 of the crown of the cover forms a substantial axially outwardly opening groove into which the inner extremity of the annular cover member 87 extends for snap-on, pry-off engagement of an annular radially outwardly directed bead 92 with retaining bumps 93 projecting radially inwardly from the axially outer portion of the cover shoulder flange 91.

For retention of the cover on the wheel, the inner cover member 85 is provided with a series, herein for retaining fingers 94 projecting generally radially outwardly as extensions from a continuous generally radially outwardly and axially inwardly sloping marginal flange extension 95 from the outer side of the axial flange 91. Each of the finger extensions 94 is of generally inwardly dished, concave convex form providing an axially inwardly directed shoulder 97 for bottoming against the tire rim side flange 81. From the shoulder 97 the finger extends generally radially outwardly and then axially outwardly to engage under resilient tension against the intermediate flange 82. At their terminal portions the fingers 94 are provided with means for engaging with retaining bumps 98 on the axially outer portion of the intermediate flange 82 and provided with generally axially inwardly facing retaining shoulders 99. Herein such means comprise generally radially outwardly angled retaining edge portions 100 on the fingers at the inner ends of centrally located inwardly opening bump receiving notches 101 in the fingers. It will be observed that the fingers 94 are of substantial width so that they extend to a substantial distance to each side of the respective notches 101 and taper to a wide flaring base juncture with the flange 95. In addition the length of the fingers is such that they extend at each side of the notch 101 axially outwardly adjacent to and at least slightly beyond the associated retaining bump 98. Thereby, generally radially outwardly turned bump side gripping, turn-preventing, winglike flanges 102 at each of the opposite sides defining the respective notches 101 oppose the respective adjacent ends of the retaining bumps (Fig. 7) in the assembly.

For increased resiliency, the respective retaining fingers 94 are preferably provided with reinforcing means, herein comprising in each instance a pair of generally longitudinally extending circumferentially spaced reinforcing ribs 103. These ribs are preferably embossed or pressed in the material of the finger to extend from adjacent juncture of the finger with the flange 95 to and through the tip portion of the finger, with the ribs projecting from the front face of the finger and defining in each instance a channel or groove 104 at the back side of the finger. The channels 104 oppose the intermediate flange 82 at the terminal portions of the fingers and thus provide convenient entry grooves or channels for insertion of a pry-off tool such as a screw driver behind the finger for prying the same free from the associated retaining bump.

In applying the cover member 85 to the wheel, the retaining fingers 94 are generally centered with respect to the retaining bumps 98, and this may be initiated by registering one of the bumps 98 in one of the notches or cut-outs 101. Then the cover member is pressed axially inwardly until all of the retaining edge portions 100 of the fingers have cammed over and snapped behind the retaining bumps 98 into retaining engagement with the retaining bump shoulders 99, and the retaining fingers have been placed under cover supporting engagement at their bottoming shoulders 97 against the side flange 81 of the tire rim.

In prying the retaining fingers 94 free from the wheel, a pry-off tool P (Fig. 8) is inserted in one of the channels 104 and pry-off leverage applied by fulcruming the pry-off tool against the shoulder of the tire rim at juncture between the intermediate flange 82 and the terminal flange 83 to resiliently deflect the retaining finger radially inwardly and then axially outwardly until the turned retaining edge 100 has been moved to the axially outer surface of the retaining bump 98. It will be appreciated that this is accomplished as a result of resilient flexure of the retaining finger 94 that is being pried off, but that the remaining retaining fingers will retain their retaining interengagement with the associated retaining bumps, thus resisting full dislodgement of the cover member. Hence, two of the retaining fingers 94 must be pried free before the cover member 85 can be dislodged. By reason of the outturned structure of the turned retaining edge 100, and the radially outward resilient tension of the terminal portion of the retaining finger, the edge portion 100 will engage and grip the outer surface of the retaining bump 98 when the pry-off tool P is withdrawn to pry off an adjacent one of the finers 94. In other words, the retaining finger that was first pried off will maintain substantially the position shown in Figure 8 until the adjacent retaining finger 94 can be pried free from its retaining bump. Thereupon, of course, the cover member 85 will fall free from the wheel.

In the cover assembly, the annular cover member 87 overlies not only the retaining fingers 94 but the remainder of the tire rim. In the present instance, the cover annulus 87 is cross sectionally configurated to provide an axially inwardly directed more or less resilient inner marginal flange or wall portion 105 merging with a generally axially outwardly directed annular rib 107. From such rib the cover is intermediately annularly inwardly dished to provide a generally axially inwardly directed rib 108 opposite the junction portion of the intermediate flange 82 and the terminal flange 83. At the radially outer side of the indented rib 108 the cover member extends generally radially and axially outwardly to an annular narrow axially outwardly directed rib 109 from which the marginal portion of the cover member slopes generally radially outwardly and axially inwardly toward the tip of the terminal flange 83 but terminates in spaced relation thereto and has an underturned edge reinforcing and finishing bead 110. For rigidity as well as ornamentation, the cover member 87 may be provided with an annular series of radially extending axially outwardly projecting spoke-like ribs 111. These ribs may, as shown, extend from adjacent to the attachment bead 92 to the outer marginal rib 109. It will be appreciated that this affords substantial rigidity for the inwardly directed rib 108 against which a pry-off tool may be levered in prying the cover member 87 from engagement with the retaining bumps 93 on the inner cover member 85.

In Figure 9 is shown a modification which is in some respects similar to the form of Figure 6 but is adapted for use with a wheel of somewhat different form and is also equipped to enable ready circulation of air through the wheel and past and through the cover. To this end, a cover assembly 115 is provided including a central cover member 117 and an outer annular cover member 118. The cover assembly is constructed and arranged for disposition at the outer side of a vehicle wheel including a wheel body 119 of the disk spider type having a central flange portion 120 located close to the median plane of the wheel and substantially inset relative to an outer marginal portion 121 of the wheel body provided with an axially inwardly directed marginal attachment flange 122 secured in suitable fashion to a base flange 123 of a tire rim and radially inset at suitable intervals such as three or four to provide air circulation openings 124 through the wheel. From the base flange 123 extends an outer side flange 125 merging with an intermediate flange 127 extending generally axially outwardly and sloping radially and provided with radially inwardly directed retaining bumps 128 adjacent merger of the intermediate flange with a generally radially outwardly and then axially outwardly turned terminal flange 129. A tubeless tire 130 may be carried by the tire rim. A rigid valve stem 131 is carried by the side flange 125 for inflating the tire.

The inner cover member 117 includes a generally axially outwardly projecting crown portion 132 having a generally axially inwardly and radially outwardly sloping side wall 133 merging with an intermediate generally radially oblique annular portion 134 adapted in assembly to extend into the inset recess afforded by the wheel body central portion 120 radially inwardly from the outer marginal portion 21 of the wheel body. Reinforcement and ornamentation for the cover member 117 may be provided in the form of generally radially and axially extending outwardly projecting ribs 135 on the side wall 133 and the intermediate annular flange portion 134.

Merging with the radially outer side of the intermediate annular portion 134 of the cover and extending in spaced relation around the wall defining the central depression in the wheel body, is a generally axially outwardly extending annular generally radially inwardly facing flange 137 defining with the inner portion of the side wall 133 of the cover an axially outwardly opening groove into which the inner edge portion of the outer annular cover member 118 is adapted to extend in assembly for cover retaining engagement of an inner peripheral bead 138 thereon with radially inwardly directed retaining bumps 139 provided on the axially outer portion of the cover flange portion 137 at juncture thereof with a generally radially outwardly extending flange portion 140 which is arranged to overlie the outer marginal portion 121 of the wheel body in spaced adjacency.

For retaining the cover assembly on the wheel, the inner cover member 117 is provided with retaining finger means in the form of a series such as four generally radially outwardly directed retaining fingers 141 provided as integral one piece extensions from the cover flange 140. The fingers 141 are of longitudinally dished or bowed form so as to engage against the side flange 125 of the tire rim and thus support the cover in spaced relation to the wheel body 119. At their outer terminal portions, the retaining fingers 141 extend generally axially outwardly and are arranged to bear in face-to-face relation under resilient radially outwardly pressing relation against the intermediate flange 127 with the retaining bumps 128 received within central outwardly opening bump receiving cut-outs or notches 142 in the respective fingers. At the axially inner end of each of the notches 142 an outturned retaining edge flange 143 is engageable interlockingly behind the inner shoulder of the retaining bump.

Application and removal of the cover member 117 with respect to the wheel is accomplished in substantially the same manner as described in connection with the cover member 85 of Figure 6. However, in the form of Figure 9, the expedient of having the valve stem 131 serve as a registration or centering guide for the cover is employed. To this end, one of the retaining fingers 141 on the cover is provided with a valve stem aperture 144 in the rim engaging inner shoulder portion of the finger. Thereby, in applying the cover to the wheel, the aperture 144 is registered with relation to the valve stem 131 and the cover member 117 then pressed axially inwardly to snap all of the remaining fingers 141 into engagement with the retaining bumps 128. In addition to turn prevention afforded by the side edges defining the slots 142 with the sides of the bumps 128, engagement of the retaining finger about the valve stem additionally assures that the cover member 117 will not turn on the wheel.

The outer cover member 118 is dimensioned to overlie the radially outer portion of the inner cover member 117 and the tire rim and is so constructed and arranged that air circulation through the wheel 124 and from behind the cover will be enabled. To this end, the outer cover member 118 has an intermediate generally axially inwardly dished annular portion 145 adapted to overlie the wheel openings 124 and having a series of air circulation openings 147 cooperative with the wheel openings 124 for circulation of air through the cover. The valve stem 131 is adapted to extend through one of the openings 147 as shown and cooperates with the axially inwardly extending flange defining such opening to hold the cover member 118 against turning on the wheel.

At the radially outer margin the cover member 118 extends generally axially outwardly and then radially outwardly into overlying spaced relation to the terminal flange 129 and has a reinforcing and finishing underturned marginal bead 148. In addition to air circulation through the openings 147, the cover member 118 thus enables air circulation in the gap afforded between the outer marginal portion and the tire rim. It will be appreciated of course, that air from or to the wheel openings 124 can circulate past the outer marginal portion 140 of the inner cover member between the fingers 141.

In applying the cover member 118 to the outer side of the wheel after the cover member 117 has been applied thereto, the valve stem 131 is registered through one of the openings 147 and the cover member 118 pressed axially inwardly to effect retaining interengagement of the inner marginal retaining bead 138 with the retaining bumps 139. To remove the cover member 118, a pry-off tool is inserted behind the outer margin thereof and pry-off force applied by successfully engaging the outer marginal bead 148 and then the intermediate rib 145.

In the form of the invention shown in Figures 10 and 11, a similar arrangement is disclosed as shown in Fig. 6, the wheel body and tire rim being substantially identical and for that reason identified by same reference numerals in the several parts thereof. For disposition at the outer side of the wheel a cover assembly 150 is provided including an inner or central cover member 151 and an outer annular cover member 152.

The inner cover member 151 includes a central crown portion 153 having a generally axially inwardly and radially outwardly sloping side wall 154 extending to a generally radially outwardly obliquely sloping intermediate annular flange portion 155 for overlying the annularly dished wheel body portion 78 in spaced adjacency. Reinforcing and ornamental ribs 157 may be provided to project from the outer side of the side wall 154 and the intermediate annular flange portion 155 and to extend short of juncture of the cover portion 155 with a generally axially outwardly extending annular flange 158 which defines with the side wall 154 a generally axially outwardly opening annular groove into which the inner margin of the annular cover member 152 is engageable.

Joining the flange 158 is an annular generally radially and axially outwardly directed flange 159 from which extends a series such as four generally radially and axially outwardly directed retaining fingers 160 of longitudinally axially inwardly dished or bowed form having the intermediate portions thereof shouldering in cover supporting relation against the side flange 81 and with the generally axially outwardly directed terminal portions engageable retainingly with the retaining bumps 98. Reception of the retaining bumps 98 in the terminal portions of the fingers is accommodated by outwardly opening central slots or notches or cut-outs 161 in the finger terminals, with an outturned inner edge 162 defining the slots and engageable behind the inwardly facing retaining shoulder of the associated retaining bump.

Application and removal of the inner cover member 151 with respect to the wheel may be accomplished similarly as described in connection with the cover member 85 of Fig. 6.

For snap-on, pry-off assembly of the outer cover member 152 with the inner cover member 151, means are provided on the outer marginal portion of the inner cover member, in this instance comprising a series of cover retaining generally gooseneck resilient spring clips 163. These clips are secured to the flange portion 159 and the adjacent base portion of the retaining finger 160 in suitable fashion as by means of respective rivets 164. Each of the clips 163 has a generally radially and axially inwardly sloping cam head portion 165 terminating in a generally axially inwardly and radially outwardly turned cover retaining shoulder flange portion 166 projecting through a clearance aperture 167 in the cover flange portion 158. As will be observed, the shoulder flange terminal portion 166 of the retaining finger faces toward the intermediate annular cover portion 155 at juncture thereof with the flange portion 158 and in each instance is thereby retainingly engageable in snap-on, pry-off relation with an outturned inner edge bead 168 of the cover member 152 arranged to nest against the outer marginal portion of the intermediate cover flange 155 under resilient inward thrusting engagement of the retaining clip shoulder flanges.

From the retaining bead 168 extends a generally axially and radially outwardly sloping inner annular wall portion 169. For reinforcement and to provide a series of successive pry-off shoulders, spaced annular axially outwardly facing offset shoulders 170 and 171 are provided in the side wall 169, affording generally axially inwardly directed annular ribs and pry-off shoulders 172 the inner of which is adjacent to the retaining spring clips 163 and the outer of which is generally opposite the juncture of the intermediate and terminal flanges 82 and 83.

From the outer end of the wall flange portion 169, the cover member 152 has a generally radially outwardly and axially inwardly sloping marginal portion 173 extending into overlying relation to the tire rim and more particularly the terminal flange 83 and provided with an outer edge extremity underturned reinforcing and finishing bead 174. It will be noted that the arrangement of the inner wall 169 and the outer annular marginal portion 173 of the cover member 152 affords a substantial chamber over the tire rim and within which a valve stem is freely housed.

Means may be provided for retaining the cover member 152 against turning. In this instance such means comprise generally radially inturned divergently related side edge flanges 175 (Figs. 10 and 11) on the shoulder terminal flange portion 166 of the retaining clips engageable bitingly against the retaining bead 168. Thereby the retaining bead 168 is held against torque displacement relative to the retaining fingers and accordingly holds the annular cover member 152 against turning. The retaining clip terminals 166 are held against twisting out of place by the side edges defining the apertures 167 through which they extend serving as lateral movement limit stops for the clip terminals.

From the foregoing it will be apparent that the present invention provides several desirable forms of the composite cover adaptable for various preferences and practical requirements, but all characterized in enabling the provision of an exceptionally deep draw composite arrangement wherein the crown of the cover assembly has a side wall that extends deep into the wheel and there appears to converge with a deeply inwardly directed outer annular portion of the cover, within a deep annular groove between the crown and the outer annular cover portion. Such a deep draw cover arrangement is especially desirable for some of the larger, more expensive makes of automobiles where the extra cost of a cover of this sort is warranted. Nevertheless, although the cover as constructed is of a fairly massive appearance, its weight is actually substantially minimized by virtue of the fact that the cover components are made from thin sheet metal such as stainless steel, brass or the like susceptible of a suitable finish such as a polished or burnished and plated high lustrous finish.

While the inner of the cover members lends itself to as expedient and inexpensive a drawing as practicable both from the die work involved and the utilization of material, the annular outer of the cover members may either be drawn to shape or formed from rolled strip material.

In all forms of the invention, the engagement of the retaining fingers with axially outward thrust against the bump shoulders on the tire rim assures not only positive retention against unintentional displacement of the cover, but also by the inward seating thrust of the fingers or adjacent cover portion against the wheel positive assurance against looseness or rattling. Also, there is provided positive assurance against turning of the cover on the wheel.

It will be understood that modifications and variations may be effected without departing from the scope of the novel concepts of the present invention.

I claim as my invention:

1. In a wheel structure including a wheel body and a tire rim with cover retaining bumps on a flange of the tire rim, a cover for disposition at the outer side of the wheel including a cover portion for adjacently overlying the juncture area of the wheel body and tire rim and having generally radially and axially outwardly extending finger extensions having terminal portions for engagement in face to face relation with said rim flange and provided with edges thrustingly engaging interlockingly behind the retaining bumps, said retaining fingers being of substantial width and having longitudinal reinforcing rib means thereon extending from the inner ends of the fingers to said terminal portions and functioning to maintain a strong resilient tensioned engagement of the terminal portions with the rim flange.

2. In a wheel structure including a wheel body and a tire rim with cover retaining bumps on a flange of the tire rim, a cover for disposition at the outer side of the wheel including a cover portion for adjacently overlying the juncture area of the wheel body and tire rim and having generally radially and axially outwardly extending finger extensions having terminal portions for engagement in face to face relation with said rim flange and provided with edges thrustingly engaging interlockingly behind the retaining bumps, said retaining fingers being of substantial width and having longitudinal reinforcing rib means thereon, said rib means affording a channel at the backside of the retaining fingers leading to said edge and operable to assist in guiding the fingers in cooperation with the retaining bump into substantially centered engagement with the retaining bump with said edge as the finger is pressed axially inwardly into engagement with the retaining bump.

3. In a wheel structure including a wheel body and a tire rim with cover retaining bumps on a flange of the tire rim, a cover for disposition at the outer side of the wheel including a cover portion for adjacently overlying the juncture area of the wheel body and tire rim and having generally radially and axially outwardly extending finger extensions having terminal portions for engagement in face to face relation with said rim flange and provided with edges thrustingly engaging interlockingly behind the retaining bumps, said retaining fingers being of substantial width and having longitudinal reinforcing rib means thereon, said reinforcing rib means comprising a pry-off channel spaced laterally from the retaining edge, and engageable by a pry-off tool for flexing the retaining finger out of engagement with the retaining bump.

4. In a cover for disposition at the outer side of a vehicle wheel including a tire rim having a radially inwardly facing flange provided with a circumferential series of radially inwardly projecting cover retaining bumps, a cover body having a series of circumferentially spaced generally radially and axially outwardly extending peripheral retaining fingers of substantial circumferential width and provided with terminal portions having respective notches therein receptive of said retaining bumps and affording at the axially inner side of the notches retaining shoulders engageable with the retaining bumps to hold the cover on the wheel, the extremity of the fingers being provided with a generally return-bent radially and axially inwardly directed flange portion and affording a substantial gap outwardly beyond said shoulder receptive of a pry-off tool for exertion of pry-off tool leverage against said flange to flex the fingers out of engagement with the bumps.

5. In a cover for disposition at the outer side of a vehicle wheel including a tire rim with an annular flange provided with cover retaining shoulder means, a cover body of substantially smaller diameter than said annular flange and having a marginal generally axially outwardly extending annular flange of limited width provided with generally radially and axially outwardly projecting retaining finger extensions of substantial circumferential width and having retaining terminals engageable in press-on pry-off relation with the rim shoulder, said cover flange having on the axially outer portion thereof aligned with the respective fingers generally radially inwardly extending retaining bumps embossed therein, and an annular cover member of a diameter to concealingly overlie said fingers and having an inner rigid bead margin of a diameter to telescope into said cover flange and being retainingly engageable in press-on pry-off relation with said bumps on said flange and in such engagement resiliently deflecting the bumps radially outwardly and thereby placing said fingers aligned with the bumps under resilient generally radially outwardly thrusting tension toward the rim shoulder engaged thereby.

6. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, a portion of said cover being bottomed against said wheel to back up the engagement of said free edge with said axial flange portion, and circumferentially spaced bumps on the axial flange portion and with said edges engaged therebehind retaining the cover body in assembly with the wheel.

7. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to back up the engagement of said free edge with said axial flange portion, said axial finger portion being notched at its axially outer end defining a recess having an edge area including said edge engaged about three sides of a bump on said axial flange portion.

8. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to back up the engagement of said free edge with said axial flange portion, said axial finger portion having a terminal end turned radially inwardly which terminal end has a notched area for receipt of a pry-off tool.

9. A wheel structure as defined in claim 6 wherein said portion of the cover that bottoms against the wheel comprises shoulders on the radially extending portions of the fingers and such shoulders engaging against the tire rim radially inwardly from said axial flange portion of the rim.

10. A wheel structure as defined in claim 6 wherein said portion of the cover that bottoms against the wheel comprises an annular generally axially inwardly extending part of the cover body radially inwardly disposed relative to the fingers.

11. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face-to-face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, a portion of said cover being bottomed against said wheel to back up the engagement of said free edge with said axial flange portion, circumferentially spaced bumps on the axial flange portion and with said edges engaged therebehind retaining the cover body in assembly with the wheel, and an annular cover member for concealing said fingers and of a diameter to overlie the tire rim and having a radially inner edge structure retainingly engageable with said cover body, the tire rim having projecting therefrom a rigid valve stem, the valve stem extending through one of said fingers and said annular cover member and retaining the annular cover member against turning relative to said cover body and the wheel.

12. In a wheel structure a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face-to-face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, a portion of said cover being bottomed against said wheel to back up the engagement of said free edge with said axial flange portion, and circumferentially spaced bumps on the axial flange portion and with said edges engaged therebehind retaining the cover body in assembly with the wheel, said finger edges being provided with terminal portions spaced from the respective retaining bumps and disposed in gap relation to the tire rim for engagement in the gaps thus provided of a pry-off tool for deflecting the respective edges away from the engagement with the respective retaining bumps to dislodge such edges when it is desired to remove the cover from the wheel.

13. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face-to-face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, a portion of said cover being bottomed against said wheel to back up the engagement of said free edge with said axial flange portion, and circumferentially spaced bumps on the axial flange portion and with said edges engaged therebehind retaining the cover body in assembly with the wheel, said edges being turned to project generally radially outwardly toward said axial flange for thrusting engagement as aforesaid with said bumps.

14. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face-to-face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, a portion of said cover being bottomed against said wheel to back up the engagement of said free edge with said axial flange portion, circumferentially spaced bumps on the axial flange portion and with said edges engaged therebehind retaining the cover body in assembly with the wheel, an annular cover member for overlying and concealing said fingers and having a radially inner turned bead edge, and retaining spring fingers on the cover having biting edge means retainingly engaging said bead edge to hold the annular cover member in assembly and also against turning relative to said cover body.

References Cited in the file of this patent

UNITED STATES PATENTS

| | | |
|---|---|---|
| 2,127,598 | Horn | Aug. 23, 1938 |
| 2,309,519 | Lyon | Jan. 26, 1943 |
| 2,368,246 | Lyon | Jan. 30, 1945 |
| 2,544,699 | Lyon | Mar. 13, 1951 |
| 2,600,412 | Lyon | June 17, 1952 |
| 2,624,640 | Lyon | Jan. 6, 1953 |
| 2,669,487 | Horn | Feb. 16, 1954 |
| 2,675,040 | Raun et al. | Apr. 13, 1954 |

FOREIGN PATENTS

| | | |
|---|---|---|
| 830,302 | Germany | Feb. 4, 1952 |